(12) United States Patent
Esnault et al.

(10) Patent No.: US 11,718,186 B2
(45) Date of Patent: Aug. 8, 2023

(54) MOTOR WITH PREDICTIVE ADJUSTMENT, MOTOR CONTROLLER, AND METHOD FOR AUTOMATICALLY ADJUSTING SAID MOTOR

(71) Applicant: Orange, Paris (FR)

(72) Inventors: Régis Esnault, Châtillon (FR); Stéphane Louis Dit Picard, Châtillon (FR); William Correa, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 258 days.

(21) Appl. No.: 16/768,010

(22) PCT Filed: Nov. 9, 2018

(86) PCT No.: PCT/FR2018/052786
§ 371 (c)(1),
(2) Date: May 28, 2020

(87) PCT Pub. No.: WO2019/106252
PCT Pub. Date: Jun. 6, 2019

(65) Prior Publication Data
US 2020/0361320 A1    Nov. 19, 2020

(30) Foreign Application Priority Data
Nov. 30, 2017    (FR) ...................................... 1761476

(51) Int. Cl.
*B60L 15/20*    (2006.01)
*B60W 20/12*    (2016.01)
(Continued)

(52) U.S. Cl.
CPC ......... *B60L 15/2045* (2013.01); *B60W 20/12* (2016.01); *B60W 50/0097* (2013.01);
(Continued)

(58) Field of Classification Search
CPC ............. B60L 15/2045; B60L 2240/12; B60L 2240/645; B60L 2240/647; B60L 2260/42;
(Continued)

(56) References Cited

U.S. PATENT DOCUMENTS

| | | | |
|---|---|---|---|
| 6,208,931 B1 | 3/2001 | Schoettle et al. | |
| 2004/0263099 A1* | 12/2004 | Maslov | ................... B60L 50/20 318/400.24 |
| 2005/0052080 A1* | 3/2005 | Maslov | ................... H02K 21/22 307/10.1 |

FOREIGN PATENT DOCUMENTS

| | | |
|---|---|---|
| DE | 10 2013 223525 A1 | 5/2014 |
| EP | 3 015 333 A1 | 5/2016 |
| WO | WO 2011/128410 A1 | 10/2011 |

OTHER PUBLICATIONS

International Search Report and Written Opinion dated Feb. 22, 2019 for Application No. PCT/FR2018/052786.

* cited by examiner

*Primary Examiner* — Richard M Camby
(74) *Attorney, Agent, or Firm* — Knobbe, Martens, Olson & Bear, LLP

(57) ABSTRACT

Embodiments described herein relate to the field of transport, particularly motor vehicles. A motor with predictive adjustment is described, as well as a motor controller of a vehicle, which is capable of automatically adjusting a physical parameter of a motor, such as the width of the air gap of an electric motor. A motor of a vehicle can include at least one physical parameter capable of being adjusted according to characteristic data predicted from the current path of the vehicle based on data provided by at least one vehicle motor sensor. Thus, the motor can be automatically adjusted according to characteristic data predicted from the current (Continued)

Figure 3:
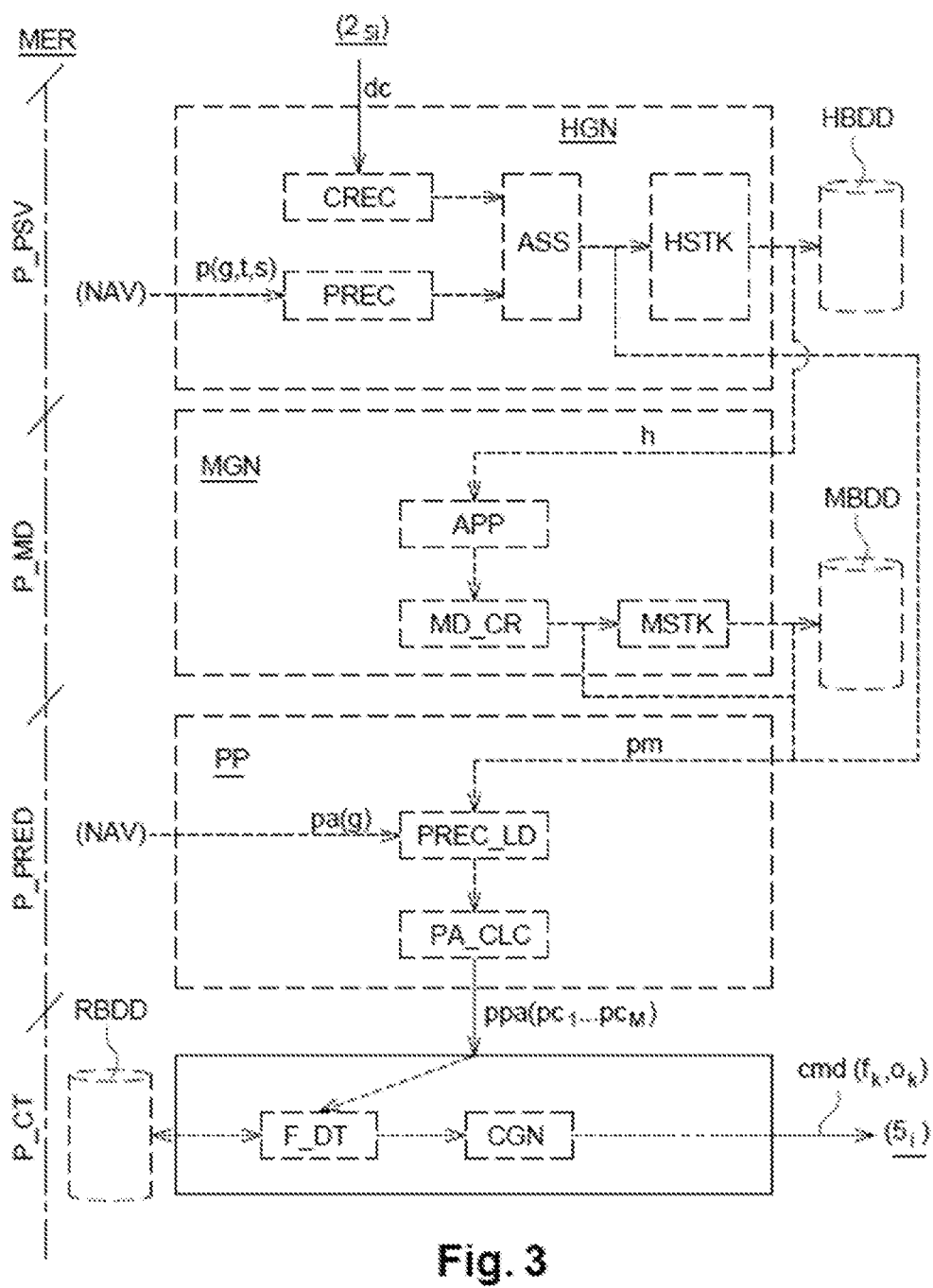

path based on the data of a motor sensor for optimizing the use of the motor, with respect to a parameter such as power consumption, transmission efficiency, or rotor warming, regardless of the route.

19 Claims, 2 Drawing Sheets

(51) Int. Cl.
  *G06N 20/00* (2019.01)
  *B60W 50/00* (2006.01)
(52) U.S. Cl.
  CPC .......... *G06N 20/00* (2019.01); *B60L 2240/12* (2013.01); *B60L 2240/645* (2013.01); *B60L 2240/647* (2013.01); *B60L 2260/42* (2013.01); *B60L 2260/50* (2013.01); *B60W 2050/0075* (2013.01); *B60W 2050/0088* (2013.01); *B60W 2520/10* (2013.01); *B60W 2552/05* (2020.02); *B60W 2556/10* (2020.02); *B60W 2710/08* (2013.01)
(58) Field of Classification Search
  CPC ............... B60L 2260/50; B60W 20/12; B60W 50/0097; B60W 2050/0075; B60W 2050/0088; B60W 2520/10; B60W 2552/05; B60W 2556/10; B60W 2710/08; B60W 2556/50; B60W 2510/305; G06N 20/00; Y02T 10/40; Y02T 10/72; Y02T 10/64; Y02T 10/84; Y02T 90/16
  See application file for complete search history.

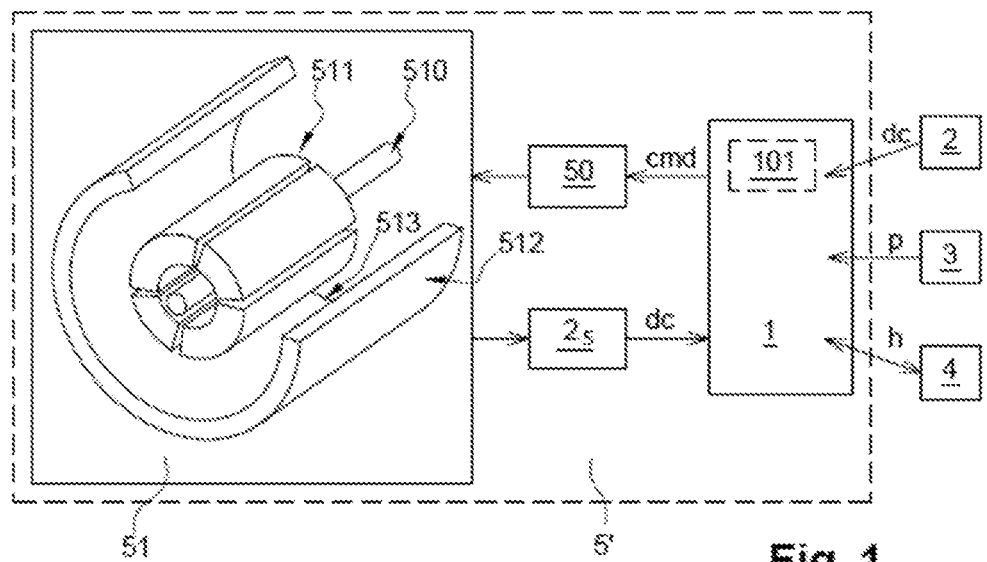
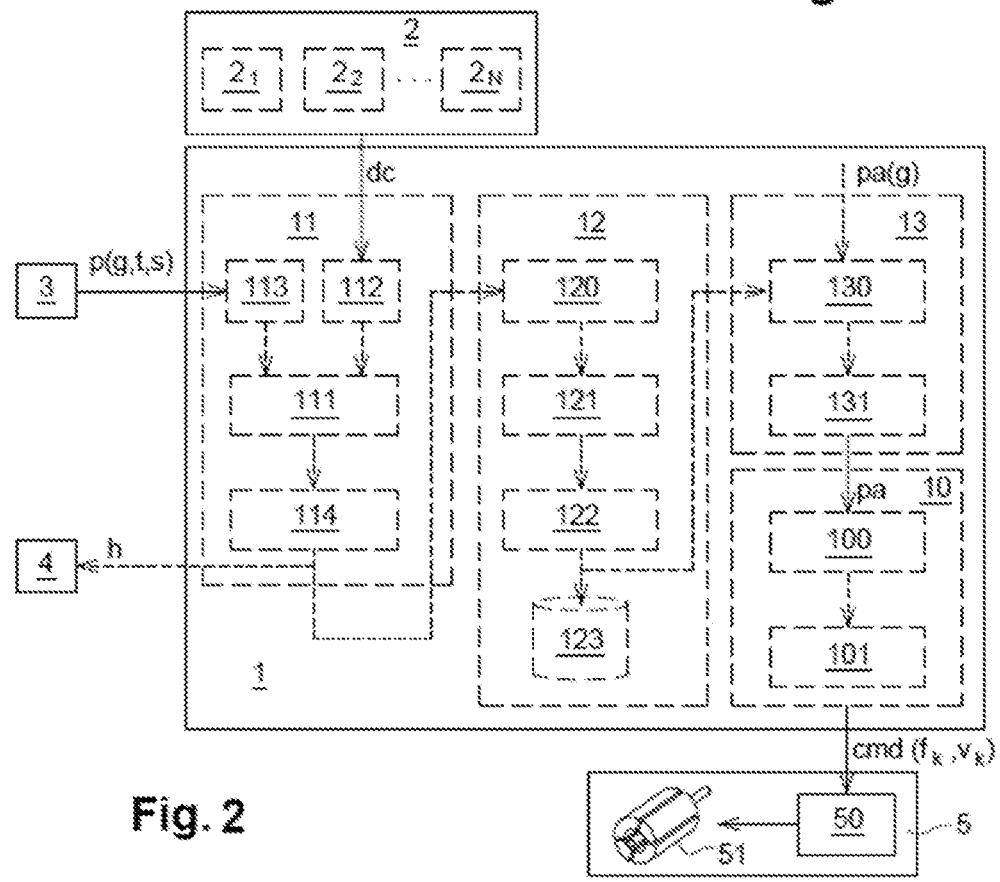

MOTOR WITH PREDICTIVE ADJUSTMENT, MOTOR CONTROLLER, AND METHOD FOR AUTOMATICALLY ADJUSTING SAID MOTOR

RELATED APPLICATIONS

This application is the U.S. National Phase of Application No. PCT/FR2018/052786 entitled "MOTOR WITH PREDICTIVE ADJUSTMENT, MOTOR CONTROLLER, AND METHOD FOR AUTOMATICALLY ADJUSTING SAID MOTOR" and filed Nov. 9, 2018, which claims the benefit of French Patent Application No. 1761476, filed Nov. 30, 2017, each of which is incorporated by reference in its entirety.

The invention relates to the field of transport, notably motor vehicle transport. The invention relates to a motor with predictive adjustment and notably to a motor controller of a vehicle, which notably is capable of automatically adjusting a physical parameter of a motor, such as the width of the airgap of an electric motor, etc.

The electric motor is an electromechanical device for converting electrical energy into mechanical energy. An electric motor is composed mainly of a fixed stator and a rotor which turns. The stator surrounds the rotor and generates a magnetic field which passes through it. The rotor is formed by a coil of conducting wires placed on the periphery of a rotating shaft. The way in which the conducting wires are arranged provides for creating forces. The latter will form the motor torque. The higher the torque, the greater the power released when moving off.

There are several generations of electric motors. The first were DC motors, the efficiency of which was limited to 90%. They posed problems, notably related to high rotation speed and heat losses at the rotor. The second generation used for propulsion of motor vehicles used more robust induction or asynchronous motors. The magnetic slip, enabling the creation of the torque, involves losses at the rotor and hence an efficiency which peaks at 82% and which falls rapidly to 75%. The third generation is the synchronous motor which, even though potentially less robust, stands out in the majority of cases. It is historically the motor used by the alternator of vehicles with combustion engines (petrol, diesel). In this third generation, there are two competing families: the wound-rotor synchronous motor, and the permanent magnet motor.

These motors are used both on electric vehicles and on hybrid vehicles. Today, adjusting the speed of the wheels is performed by virtue, notably, of a mechanical differential for adjusting the rotation speed provided by the mechanical energy at the output of the motor at the wheels of the vehicle via the transmission. For example, an automatic gearbox includes such a mechanical differential. The drawback of such a technique for adjusting the rotation speed at the output of an electric motor is the efficiency losses related to the mechanical transmission despite the advantage of being able to adjust the speed at the output of the motor, which until now was not possible on a wheel motor.

One of the aims of the invention is to bring about improvements over the prior art.

A subject of the invention is a motor with predictive adjustment, of a vehicle, including at least one physical parameter capable of being adjusted as a function of a predicted characteristic item of data of the current route of the vehicle based on data provided by at least one vehicle motor sensor.

Thus, the motor is automatically adjusted as a function of a predicted characteristic item of data of the current route based on data from a motor sensor thereby providing for optimizing the use of the motor, such as a combustion engine or electric motor, notably consumption (for example electrical power consumption), transmission efficiency, heating-up of the rotor of an electric motor, etc, regardless of the route, notably on a deteriorated road or in bends etc, taking into consideration various characteristics relating to the route such as speed, road condition, and, for the electric motor, airgap width, rotor temperature, etc.

Advantageously, the motor is an electric motor including a rotor and a stator separated by an airgap, the width of which forms the adjustable physical parameter.

Another subject of the invention is a controller capable of automatically adjusting at least one motor of a vehicle as a function of a predicted characteristic item of data of the current route of the vehicle based on data provided by sensors of the vehicle.

Advantageously, the controller is capable of adjusting at least one physical parameter of one of the following:
an electric motor of the alternator,
a propulsion motor,
an airgap of the electric motor.

Advantageously, the controller includes at least one transmitter of airgap width commands to a regulator installed in the vehicle, the commanded width being a function of a predicted characteristic item of data of the current route of the vehicle.

Another subject of the invention is a method for automatically adjusting a motor of a vehicle as a function of a predicted characteristic item of data of the current route of the vehicle based on data provided by vehicle motor sensors.

Thus, the automatic adjustment method directly commands the motor as a function of a predicted characteristic item of data of the current route based on data from a motor sensor thereby providing for optimizing the use of the motor, such as an electric motor, notably electrical power consumption, transmission efficiency, heating-up of the rotor, etc, regardless of the route, notably on a deteriorated road or in bends etc, taking into consideration various characteristics relating to the route such as speed, road condition, airgap width, rotor temperature, etc.

Advantageously, the predicted characteristic item of data is a function of a history of the motor associating at least one physical parameter of the motor during a previous route with at least one characteristic item of data of the previous route.

Thus, the adjustment takes account not only of characteristic data specific to the route—road type, route type, etc—but also of data relating to the vehicle-operator or vehicle-driver system since it takes account of data relating to previous routes (speed, path, etc as a function of the road and/or route type, etc).

Advantageously, the characteristic item of data is predicted using a model worked out by machine learning.

Thus, if the vehicle has not yet taken the current path, or at least not under current conditions (change in condition of the road, path, etc), a model worked out by machine learning as a function of previous routes nevertheless provides for adapting the vehicle to the current path.

Advantageously, the machine learning is carried out based on a history of the motor associating at least one parameter of the motor during a previous route with at least one characteristic item of data of the previous route.

Advantageously, the adjustment method includes a prediction of the current route of the vehicle based on data provided by vehicle motor sensors.

Advantageously, the automatic adjustment method includes the generation of a history of the motor associating at least one physical parameter of the motor during a previous route with at least one characteristic item of data of the previous route.

Advantageously, the automatic adjustment method includes machine learning based on the generated history providing a behavior model for the motor.

Advantageously, the automatic adjustment method includes an estimate of the current route as a function of the generated history, the estimated current route providing at least the predicted characteristic item of data of the current route.

Advantageously, a current-route characteristic item of data includes at least one of the following:
vehicle speed,
road quality,
route type.

Advantageously, according to one implementation of the invention, the various steps of the method according to the invention are implemented by software or a computer program, this software comprising software instructions intended to be executed by a data processor of a device forming part of a controller of a motor and being designed to command the execution of the various steps of this method.

The invention therefore relates also to a program comprising program code instructions for the execution of the steps of the automatic adjustment method when said program is executed by a processor.

This program can use any programming language and be in the form of source code, object code or code intermediate between source code and object code such as in a partially compiled form or in any other desirable form.

The characteristics and advantages of the invention will become clearer upon reading the description, given by way of example, and from the drawings referred to which represent:

FIG. 1, a simplified diagram of an electric motor with predictive adjustment according to the invention;

FIG. 2, a simplified diagram of a motor controller according to the invention;

FIG. 3, a simplified diagram of a method for automatically adjusting a motor according to the invention.

FIG. 1 illustrates a simplified diagram of a motor with predictive adjustment according to the invention in the particular case of an electric motor.

An electric motor 5 of a vehicle is capable of being adjusted on the command of a controller 1 as a function of a predicted characteristic item of data $pc_1 \ldots pc_M$ of the current route pa of the vehicle based on data dc provided by at least one sensor $2_5$ of the electric motor 5.

In particular, the controller 1 includes at least one transmitter 101 of airgap width commands to a regulator, such as an electronic adjustment board 50 for the electric motor installed in the vehicle (notably in the electric motor 5). The commanded width is a function of the predicted characteristic item of data of the current route of the vehicle.

The electric motor 5' may include, in addition to the actual motor 51, the regulator 50 and the sensor $2_5$, the controller 1 according to the invention.

One or more sensors 2, including at least one sensor $2_5$ of the electric motor 51 of the vehicle, provide captured data dc to the controller 1. Notably, the at least one sensor $2_5$ of the electric motor provides transmission efficiency data, and possibly other data such as rotor temperature, electrical power consumption, etc.

In particular, the controller 1 records this data with information relating to the route when this data is being captured notably in the form of a history h in a historization system 4. The information relating to the route is provided to the controller 1, for example, through a navigation system 3.

In particular, the controller 1 uses the captured data dc from the capture system 2 (including the sensor $2_5$ of the electric motor 5), notably by consulting the histories h of the historization system 4, to command cmd the regulator 50. For example, the controller 1 models the behavior of the electric motor 5 as a function of the current route to determine the adjustment to be carried out.

In particular, the electric motor 51 includes a stator 512 and a rotor 511 transmitting mechanical energy in the form of a rotational force to the shaft 510 by converting the electrical energy due to the magnetic field generated by the rotor 511 and the stator 512. In the particular case of the adjustment of the width of the airgap 513 of the electric motor 5, the controller 1 thus provides for optimizing the transmission efficiency of the electric motor 5 as a function of data relating to the batteries (charge, state, etc), and data about the variator of the electric motor, as a function of the prediction of the current route (more specifically predicted characteristic data of the current route such as torque, predicted speed, etc).

FIG. 2 illustrates a simplified diagram of a motor controller according to the invention.

The controller 1 is capable of automatically adjusting at least one motor 5 of a vehicle as a function of a predicted characteristic item of data $pc_1 \ldots pc_M$ of the current route pa of the vehicle based on data dc provided by at least one sensor $2_5$ of the motor 5.

Notably, the controller 1 includes at least one supervisor 10 capable of transmitting the adapted adjustment vk to the motor 5.

In particular, the controller 1 includes a computer 100 for calculating an adjustment value vk of a parameter fk of the motor 5. This computer 100 is capable of determining the adjustment value vk notably according to a function or rules of optimization of the motor 5 on at least one characteristic item of data $pc_1 \ldots pc_M$ of a route. These rules of optimization are in particular stored in a rules database (not illustrated). The supervisor 10 notably includes this computer 100.

For example, for an airgap width parameter fk of the electric motor, the adjustment value is calculated notably as a function of transmission efficiency optimization and/or of the electrical power consumption of the electric motor.

In particular, the controller 1 includes a generator 101 of a command for adjusting a motor $cmd(f_k, v_k)$. This command cmd notably includes an adjustment value vk of a parameter fk of the motor 5. Either the controller 1 is capable of directly transmitting this command to the parameter fk of the motor 5 to trigger the adjustment, or the command cmd also includes an identifier of the parameter fk to be adjusted and the controller 1 is capable of transmitting the command to the motor 5 which is capable of adjusting the parameter fk to the value vk. This command generator 101 is notably implemented in the supervisor 10.

Notably, the controller 1 includes at least one recorder 11 of previous routes, capable of storing at least data captured during at least one previous route dc in relation to at least one item of characteristic data g,t,s of the previous route p(g,t,s).

In particular, the controller 1 includes a receiver 112 of data dc provided by one or more sensors $2_1 \ldots 2_N$, notably a motor sensor $2_5$ and/or a set/system of sensors 2 including several sensors $2_1 \ldots 2_N$ of the vehicle, such as a camera(s), tire sensors, accelerometers, a variator, accumulator/battery charge sensor, etc. These sensors are notably connected sensors, the data histories of which are preserved possibly remotely. This captured-data receiver 112 is notably implemented in the recorder 11 of previous routes.

In particular, the controller 1 includes a receiver 113 of data relating to a route p(g,t,s) being followed during the capture of data dc. This receiver 113 of data relating to the route is notably implemented in the recorder 11 of previous routes.

In particular, the controller 1 includes a coupler 111 of data dc provided by one or more sensors $2_1 \ldots 2_N$, notably a motor sensor $2_5$, with data relating to a route p(g,t,s) being followed during the capture of data dc. The combined data forms a history of motor behavior during previous routes. This coupler 111 is notably implemented in the recorder 11 of previous routes.

In particular, the controller 1 includes a recorder 114 of the history of motor behavior during previous routes, notably formed by data dc provided by one or more sensors $2_1 \ldots 2_N$, notably a motor sensor $2_5$, combined with data relating to a route p(g,t,s) being followed during the capture of data dc. The history is notably recorded in a history database 4. This history recorder 114 is notably implemented in the recorder 11 of previous routes.

Notably, the controller 1 includes at least one route modeler 12, notably for a vehicle that is predetermined and possibly driven by a given user, in particular a modeler of the behavior of the motor.

In particular, the controller 1 includes a machine learning device 120. The machine learning device 120 uses a vehicle motor history h associating at least one parameter $f_k$ of the vehicle motor during a previous route p with at least one characteristic item of data g, t, s of the previous route p, notably a history generated by the coupler 111. If necessary, the machine learning device 120 retrieves the histories of the previous routes recorded in a history database 4. This machine learning device 120 is notably implemented in the route modeler 12.

In particular, the controller 1 includes a model generator 121 for a model based on the result of the machine learning device 120. If necessary, a recorder 122 stores the created model in a model database 123. The model generator 121 and/or its recorder 122 are notably implemented in the route modeler 12.

Notably, the controller 1 includes at least one route predictor 13 capable of predicting a route as a function of captured data dc.

In particular, the controller 1 includes a model loader 130 for a model as a function of the current route pa(g) either directly from the modeler 12 and/or from the model generator 121 and/or from a model database 123. The current route pa(g) is provided notably by a navigation system 3, for example in the form of a series of geographic coordinates, or in the form of two geographic ends of a journey—start and end—and of routes calculated by the navigation device between these two ends. The navigation system 3 notably includes a route database and/or a device for accessing road information (works, traffic jams, etc), notably via Internet communities such as Waze (registered trademark), opendata, etc, and uses the information provided by one or more of these devices to work out the journey for the current route pa. The model loader 130 is notably implemented in the route predictor 13.

In particular, the controller 1 includes an estimator 131 for estimating the current route ppa($pc_1 \ldots pc_M$) based on captured data dc, notably by using the generated history of previous routes and/or the generated model. The route estimator 131 is notably implemented in the route predictor 13.

In particular, the route predictor 13 provides at least one predicted characteristic item of data $pc_1 \ldots pc_M$ of the current route, or even the predicted route ppa, to the supervisor 10 which is capable of transmitting to the motor 5 an adjustment vk adapted to at least one predicted characteristic item of data provided by the predictor 13, notably in the form of a command cmd($f_k$, $v_k$).

In particular, the motor 5 of the vehicle includes at least one device among the following:
a motor sensor $2_5$,
a regulator 51, such as an electronic adjustment board for the motor capable notably of adjusting the width of the airgap of an electric motor, etc.

FIG. 3 illustrates a simplified diagram of an automatic motor adjustment method MER according to the invention.

The automatic motor adjustment method MER automatically adjusts cmd($f_k$,$v_k$) at least one motor 5 of a vehicle as a function of a predicted characteristic $pc_1 \ldots pc_M$ of the current route of the vehicle based on data dc provided by at least one sensor $2_5$ of the motor 5.

In particular, the predicted characteristic item of data $pc_1 \ldots pc_M$ is a function of a vehicle motor history h associating at least one parameter $f_k$ of the vehicle motor during a previous route p with at least one characteristic item of data g, t, s of the previous route p.

In particular, the characteristic data $pc_1 \ldots pc_M$ is predicted using a model pm worked out by machine learning APP.

In particular, the machine learning APP is performed based on a vehicle motor history h associating at least one parameter fk of the vehicle motor during a previous route p, with at least one characteristic item of data g, t, s of the previous route p.

In particular, the automatic motor adjustment method MER includes a prediction of the current route of the vehicle PP based on data dc provided by at least one sensor $2_5$ of the motor 5.

In particular, the automatic adjustment method MER includes the generation of a vehicle motor history HGN associating at least one parameter fk of the vehicle motor during a previous route p with at least one characteristic item of data g, t, s of the previous route p.

In particular, the automatic adjustment method MER includes machine learning APP based on the generated history h providing a route model pm as a function of characteristics g of the route pa.

In particular, the automatic adjustment method MER includes an estimate PP of the current route as a function of the generated history h, the estimated current route ppa providing at least the predicted characteristic item of data $pc_1 \ldots pc_M$ of the current route.

Advantageously, a characteristic item of data $pc_1 \ldots pc_M$ of the current route includes at least one of the following:
vehicle speed s,
road quality qr,
route type t,
route coordinates g, etc.

The captured data dc provided by one or more sensors $2n$, notably a motor sensor $2_5$, are used by the automatic adjustment method MER for a motor 5 to adapt the adjustment of the motor 5 as a function of the current route pa.

Notably, the automatic adjustment method MER for a motor 5 includes at least one control phase P_CT during which the automatic adjustment method transmits the adapted adjustment vk to the motor 5.

In particular, the automatic adjustment method MER of the motor 5 includes the determination F_DT of an adjustment value vk of a parameter fk of the motor 5. This determination F_DT is notably carried out according to a function or rules of optimization of the motor 5 on at least one characteristic item of data $pc_1 \ldots pc_M$ of a route. These rules of optimization are in particular stored in a rules database RBDD. This determination F_DT is notably carried out during the control phase P_CT.

In particular, the automatic adjustment method MER of the motor 5 includes the generation CGN of an adjustment command for a motor cmd(fk,vk). This command cmd notably includes an adjustment value vk of a parameter fk of the motor 5. Either the adjustment method MER directly transmits this command to the parameter fk of the motor 5 to trigger the adjustment, or the command cmd also includes an identifier of the parameter fk to be adjusted and the adjustment method MER transmits the command to the motor 5 which adjusts the parameter fk to the value vk. This command generation is notably carried out during the control phase P_CT.

Notably, the automatic adjustment method MER for a motor 5 includes at least one phase for recording previous routes P_PSV during which the automatic adjustment method stores at least data dc captured during at least one previous route in relation to at least one item of characteristic data g, t, s of the previous route p(g,t,s).

In particular, the automatic adjustment method MER for a motor includes the receiving CREC of data dc provided by one or more sensors $2n$, notably a motor sensor $2_5$. This receiving CREC of captured data is notably carried out during the phase for recording previous routes P_PSV.

In particular, the automatic adjustment method MER for a motor includes the receiving PREC of data relating to a route p(g,t,s) being followed during the capture of data dc. This receiving PREC of data relating to the route is notably carried out during the phase for recording previous routes P_PSV.

In particular, the automatic adjustment method MER for a motor includes the combining ASS of data dc provided by one or more sensors $2n$, notably a motor sensor $2_5$, with data relating to a route p(g,t,s) being followed during the capture of data dc. The combined data forms a history of motor behavior during previous routes. This combining ASS is notably carried out during the phase for recording previous routes P_PSV.

In particular, the automatic adjustment method MER for a motor includes the recording HSTK of a history of motor behavior during previous routes, which history is notably formed by data dc provided by one or more sensors $2n$, notably a motor sensor $2_5$, combined with data relating to a route p(g,t,s) being followed during the capture of data dc. The history is notably recorded in a history database HBDD. This history recording HSTK is notably carried out during the phase for recording previous routes P_PSV.

The automatic adjustment method MER for a motor may include a history generation HGN including one or more of the following steps:
the receiving CREC of data dc provided by one or more sensors $2n$, notably a motor sensor $2_5$,
the receiving PREC of data relating to a route p(g,t,s) being followed during the capture of data dc, notably during the reception CREC.
the combining ASS of data dc provided by one or more sensors $2n$, notably a motor sensor $2_5$, notably data provided upon the reception step CREC, with data relating to a route p(g,t,s) being followed during the capture of data dc, notably data relating to the route, which data is received through the reception step PREC. The combined data forms a history of motor behavior during previous routes.
the recording HSTK of a history of motor behavior during previous routes, which history is notably formed by data dc provided by one or more sensors $2n$, notably a motor sensor $2_5$, combined with data relating to a route p(g,t,s) being followed during the capture of data dc. In particular, the recording HSTK stores the history provided by the combination step ASS.

This history generation HGN is notably carried out during the phase for recording previous routes P_PSV.

Notably, the automatic adjustment method MER for a motor 5 includes at least one route modeling phase P_MD, notably for a predetermined vehicle, and possibly driven by a given user, in particular modeling the behavior of the motor.

In particular, the automatic adjustment method MER for a motor 5 includes machine learning APP. The machine learning APP is performed based on a vehicle motor history h associating at least one parameter $f_k$ of the vehicle motor during a previous route p with at least one characteristic item of data g, t, s of the previous route p, notably a history generated by the combination step ASS. The machine learning APP may retrieve the histories of the previous routes recorded in a history database HBDD. This machine learning APP is notably carried out during the route modeling phase P_MD.

In particular, the automatic adjustment method MER for a motor 5 includes the creation of a model MD_CR based on the result of the machine learning APP. The model created may be recorded MSTK in a model database MBDD. For example, the model database is remote from the vehicle providing for gathering models of a user for various types of vehicles (or even various types of motors, various batteries/accumulators, etc). The model creation MD_CR and/or recording MSTK thereof are notably carried out during the route modeling phase P_MD.

The automatic adjustment method MER for a motor may include a model generation MGN including one or more of the following steps:
machine learning APP is carried out based on a vehicle motor history h associating at least one parameter $f_k$ of the vehicle motor during a previous route p with at least one characteristic item of data g, t, s of the previous route p;
creation of a model MD_CR based on the result of the machine learning, and
recording MSTK of the model created.

Model generation MGN is notably carried out during the route modeling phase P_MD.

Thus, when a user sits at the steering wheel of a vehicle, the corresponding model created beforehand can be loaded PREC_LD for predicting characteristic data, and more generally for estimating the current route PA_CLC.

Notably, the automatic adjustment method MER for a motor 5 includes at least one route prediction phase P_PRED during which a route is predicted as a function of captured data dc.

In particular, the automatic motor adjustment method MER includes the loading of a model PREC_LD as a function of the current route pa(g) either directly from the model generation MGN and/or from the model creation MD_CR and/or from a model database MBDD. The current route pa(g) is provided notably by a navigation device NAV, for example in the form of a series of geographic coordinates, or in the form of two geographic ends of a journey—start and end—and of routes calculated by the navigation device between these two ends. Model loading PREC_LD is notably carried out during the route prediction phase P_PRED.

In particular, the automatic motor adjustment method MER includes an estimation PA_CLC of the current route ppa($pc_1 \ldots pc_M$) based on captured data dc, notably by using the generated history of previous routes HGN, ASS and/or the generated model MGN, MD_CR. Route estimation is notably carried out during the route prediction phase P_PRED.

In particular, the automatic motor adjustment method MER includes route prediction PP and notably that of at least one characteristic item of data $pc_1 \ldots pc_M$ of the current route ppa. Route prediction PP includes at least one of the previous two steps for loading a model PREC_LD, and for estimating the current route PA_CLC. Route prediction PP is notably carried out during the route prediction phase P_PRED.

In a first variant of the invention, the automatic adjustment method first carries out machine learning for generating a model P_MD. During this first step referred to as learning, the adjustment of the motor is not adapted to the route; for example it is adjusted to a default value. In a second step, the model is not reassessed by the automatic adjustment method and is used to predict characteristic data of the current route enabling the automatic adjustment method to command an adjustment adapted to the current route of the motor according to this model.

In a second variant of the invention, each route is used to enhance the knowledge of the automatic adjustment method in relation to the behavior of the motor, even the routes for which a motor is automatically adjusted by the automatic adjustment method according to the invention. Thus, during a current route, all the data captured during previous routes is used to refine and optimize the automatic adjustment of the motor, notably by refining the behavior model for the motor and/or the vehicle.

A particular embodiment of the automatic adjustment method for a motor is a program comprising program code instructions for the execution of the steps of the automatic adjustment method when said program is executed by a processor.

Another subject of the invention is a medium. The data medium can be any entity or device capable of storing the program. For example, the medium can include a means of storage such as a ROM, for example a CD-ROM or a microelectronic circuit ROM, or a magnetic recording means, for example a floppy disk or a hard disk.

On the other hand, the data medium can be a transmittable medium such as an electrical or optical signal which can be conveyed via an electrical or optical cable, via radio or via other means. The program according to the invention can in particular be downloaded over an in particular Internet type network.

Alternatively, the data medium can be an integrated circuit in which the program is incorporated, the circuit being adapted to execute or to be used in the execution of the method in question.

In another implementation, the invention is implemented by means of software and/or hardware components. In this regard the term "module" can just as well refer to a software component as to a hardware component. A software component corresponds to one or more computer programs, one or more subroutines of a program, or more generally to any element of a program or of software suitable for implementing a function or a set of functions according to the above description. A hardware component corresponds to any element of a hardware assembly suitable for implementing a function or a set of functions.

The invention claimed is:

1. A motor with predictive adjustment for a vehicle, the motor comprising a rotor and a stator separated by an airgap, the motor configured to:
   receive, during a current route of the vehicle and from a motor controller, an airgap width command, the airgap width command being a function of a predicted characteristic item of data of the current route of the vehicle based on data provided by at least one vehicle sensor; and
   adjust, during the current route of the vehicle, the airgap of the motor.

2. The motor of claim 1, wherein the airgap of the electric motor is adjusted to optimize transmission efficiency of the electric motor based on the predicted characteristic item of data of the current route of the vehicle.

3. A motor controller, the motor controller comprising:
   a processor, the processor configured to receive data provided by sensors of the vehicle and predict a predicted characteristic item of data of the current route of the vehicle based on the data provided by sensors of the vehicle; and
   a transmitter, the transmitter configured to transmit airgap width commands to a regulator installed in the vehicle to command at least one change in an airgap width of an electric motor during the current route of the vehicle, wherein the width commanded by the airgap width commands is a function of the predicted characteristic item of data of the current route of the vehicle.

4. The motor controller of claim 3, wherein the airgap of the electric motor is adjusted to optimize transmission efficiency of the electric motor based on the predicted characteristic item of data of the current route of the vehicle.

5. The motor controller of claim 3, wherein the airgap of the electric motor is adjusted to optimize power consumption of the electric motor based on the predicted characteristic item of data of the current route of the vehicle.

6. A method for automatically adjusting a motor of a vehicle, the method including:
   receiving data from vehicle motor sensors;
   predicting a characteristic item of data of a current route of the vehicle, based on the data received from vehicle motor sensors, the predicted characteristic item of data being a function of a history of the motor associating at least one adjustable physical parameter of the motor during a previous route with at least one characteristic item of data of the previous route; and
   commanding an adjustment of the at least one adjustable physical parameter of the motor, the adjustment based on the predicted characteristic item of data of the current route of the vehicle.

7. The method of claim 6, wherein the motor comprises an electric motor, and the at least one adjustable physical parameter of the motor comprises an airgap of the electric motor.

8. The method of claim 6, wherein the characteristic item of data is predicted using a model generated using machine learning.

9. The method of claim 8, wherein the machine learning is performed based on the history of the motor associating at least one parameter of the motor during a previous route with at least one characteristic item of data of the previous route.

10. The method of claim 6, wherein the method includes predicting the current route of the vehicle based on data provided by vehicle motor sensors.

11. The method of claim 6, wherein the method includes generating the history of the motor associating the at least one adjustable physical parameter of the motor during a previous route with at least one characteristic item of data of the previous route.

12. The method of claim 11, the method additionally comprising providing a behavior model for the motor using machine learning based on the generated history.

13. The method of claim 11, the method additionally comprising estimating the current route as a function of the generated history, the estimated current route providing at least the predicted characteristic item of data of the current route.

14. The method of claim 6, wherein a characteristic item of data of the current route includes at least one of the following:

vehicle speed,
road quality, and
route type.

15. A non-transitory, computer readable medium having stored thereon instructions, which when executed by a processor, cause the processor to implement the method of claim 6.

16. The motor of claim 1, wherein the characteristic item of data of the current route of the vehicle is predicted based on data provided by at least one vehicle motor sensor.

17. The method of claim 7, wherein the airgap of the electric motor is adjusted to optimize transmission efficiency of the electric motor based on the predicted characteristic item of data of the current route of the vehicle.

18. The method of claim 7, wherein the airgap of the electric motor is adjusted to optimize power consumption of the electric motor based on the predicted characteristic item of data of the current route of the vehicle.

19. The motor of claim 1, wherein the airgap of the electric motor is adjusted to optimize power consumption of the electric motor based on the predicted characteristic item of data of the current route of the vehicle.

* * * * *